(12) United States Patent
Borg et al.

(10) Patent No.: US 10,399,742 B2
(45) Date of Patent: Sep. 3, 2019

(54) CONTAINER SYSTEM

(71) Applicant: Oregon Precision Industries, Inc., Eugene, OR (US)

(72) Inventors: Zakary James Borg, Eugene, OR (US); Ronald Lee Mellor, Jr., Springfield, OR (US)

(73) Assignee: OREGON PRECISION INDUSTRIES, INC., Eugene, OR (US)

( * ) Notice: Subject to any disclaimer, the term of this patent is extended or adjusted under 35 U.S.C. 154(b) by 172 days.

(21) Appl. No.: 15/354,856

(22) Filed: Nov. 17, 2016

(65) Prior Publication Data

US 2017/0073108 A1 Mar. 16, 2017

Related U.S. Application Data

(63) Continuation of application No. 14/527,723, filed on Oct. 29, 2014, now Pat. No. 9,517,859.

(60) Provisional application No. 61/877,794, filed on Sep. 13, 2013.

(51) Int. Cl.
| | |
|---|---|
| *B65D 21/02* | (2006.01) |
| *B65D 71/50* | (2006.01) |
| *A47F 7/00* | (2006.01) |
| *A47F 7/28* | (2006.01) |
| *F16B 2/22* | (2006.01) |

(52) U.S. Cl.
CPC ........ *B65D 21/0224* (2013.01); *A47F 7/0071* (2013.01); *A47F 7/281* (2013.01); *B65D 21/0219* (2013.01); *B65D 71/50* (2013.01); *B65D 71/502* (2013.01); *F16B 2/22* (2013.01); *Y10T 24/29* (2015.01)

(58) Field of Classification Search
CPC .. B65D 21/0224; B65D 71/502; B65D 71/50; B65D 21/0219; A47F 7/0071; A47F 7/281
USPC .................... 24/288; 206/503, 821
See application file for complete search history.

(56) References Cited

U.S. PATENT DOCUMENTS

| | | | | |
|---|---|---|---|---|
| 2,957,601 | A | | 10/1960 | Novick |
| 3,173,574 | A | | 3/1965 | Goldsmith |
| 3,180,537 | A | * | 4/1965 | Collins ............... B65D 47/265 206/501 |
| 3,317,087 | A | | 5/1967 | Landis |
| 3,417,895 | A | * | 12/1968 | Penton ................. B65D 51/28 220/23.83 |
| 3,885,672 | A | | 5/1975 | Westenrieder |
| 4,308,952 | A | | 1/1982 | Paulucci |
| 5,156,273 | A | | 10/1992 | Mortensen |
| D405,687 | S | * | 2/1999 | Borg ............................. D9/752 |
| 5,964,343 | A | * | 10/1999 | Steiner ................. B65D 71/70 206/203 |
| 7,588,275 | B2 | | 9/2009 | Borg |

(Continued)

*Primary Examiner* — Jeffrey R Allen
*Assistant Examiner* — Jennifer Castriotta
(74) *Attorney, Agent, or Firm* — Alleman Hall Creasman & Tuttle LLP (57) ABSTRACT

A container system is provided comprising an upper container and a clip body configured to attach to the top of a lower container. The clip body includes outer securing structures comprised of tabs and ledges to releasably attach to the lip of a circular rim of the lower container. Wings are configured to flex under an influence of a digit of a user to bias the ledges away from the central region of the clip body, thereby releasing the lower container.

11 Claims, 8 Drawing Sheets

(56) References Cited

U.S. PATENT DOCUMENTS

| | | | | |
|---|---|---|---|---|
| 7,661,527 B2* | 2/2010 | Cerf | ...................... | B65D 71/10 |
| | | | | 206/432 |
| 2005/0072709 A1* | 4/2005 | Mann | ................. | B65D 21/0224 |
| | | | | 206/503 |
| 2008/0173655 A1* | 7/2008 | Navarro | ............. | B65D 21/0224 |
| | | | | 220/754 |
| 2008/0224489 A1* | 9/2008 | Borg | ................. | B65D 21/0224 |
| | | | | 294/87.28 |

* cited by examiner

CONTAINER SYSTEM

CROSS REFERENCE TO RELATED APPLICATION

This application is a continuation of and claims priority to U.S. patent application Ser. No. 14/527,723, filed Oct. 29, 2014, which in turn claims priority to U.S. Provisional Patent Application Ser. No. 61/877,794, filed Sep. 13, 2013. The entire contents of each of these applications are herein incorporated by reference.

BACKGROUND

Beverage cans such as aluminum soda and juice cans are ubiquitous in modern society. While these cans offer convenience to the user, challenges remain in distributing and presenting these cans to consumers in retail stores. One challenge has been stacking beverage cans vertically as a unit for sale. Traditionally, stacking beverage cans vertically end to end as a unit for sale has involved the use of cardboard cases that envelop the vertically stacked cans and provide a stable enclosure. However, cardboard cases can be damaged easily and require additional machines for application on a packaging line. Cardboard cases also consume additional natural resources to produce, and hide the cans themselves, which sometimes feature attractive graphics.

SUMMARY

According to the present disclosure, there is provided a stacking clip for vertically attaching two beverage cans together. The stacking clip comprises ledges used to attach to the lip of a circular rim of a lower beverage can and clipping protrusions used to attach to an undercut region in a concavity of another upper beverage can. Wings are configured to flex inward under an influence of a digit of a user to bias the ledges outward away from the central region of the clip body, detaching the ledges from the rim of the attached beverage can. The stacking clip may be provided in a uni-pack configuration, which secures two cans together, or may be connected to other stacking clips to secure multiple cans together with another group of cans. Further, the uni-pack or multi-pack stacking clips may be used in concert with other products such as multipack beverage container handles that affix to a top of a group of beverage cans and include loops or handles for a user to grasp to lift the group of cans.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
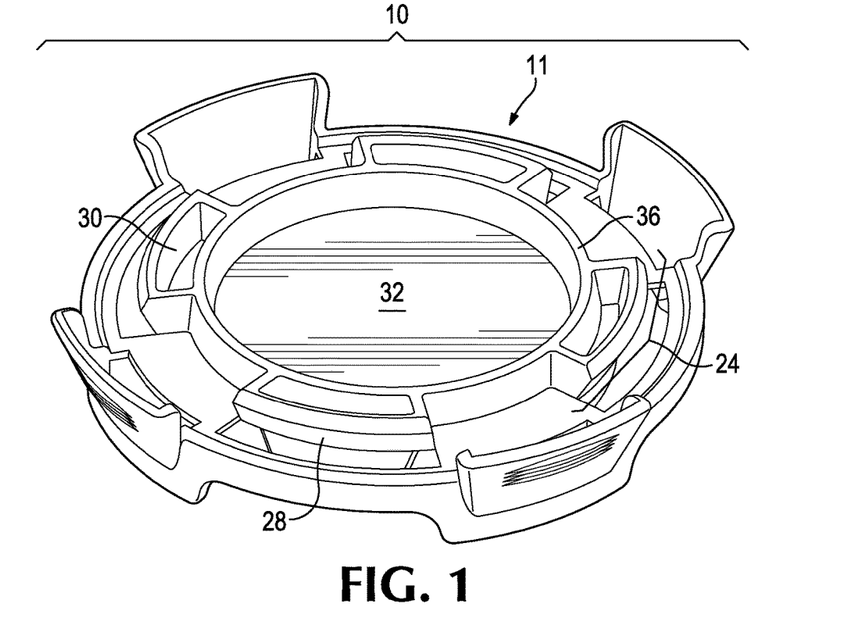
FIG. 1 illustrates a top perspective view of a stacking clip according to an embodiment of the present invention.
Figure 2:
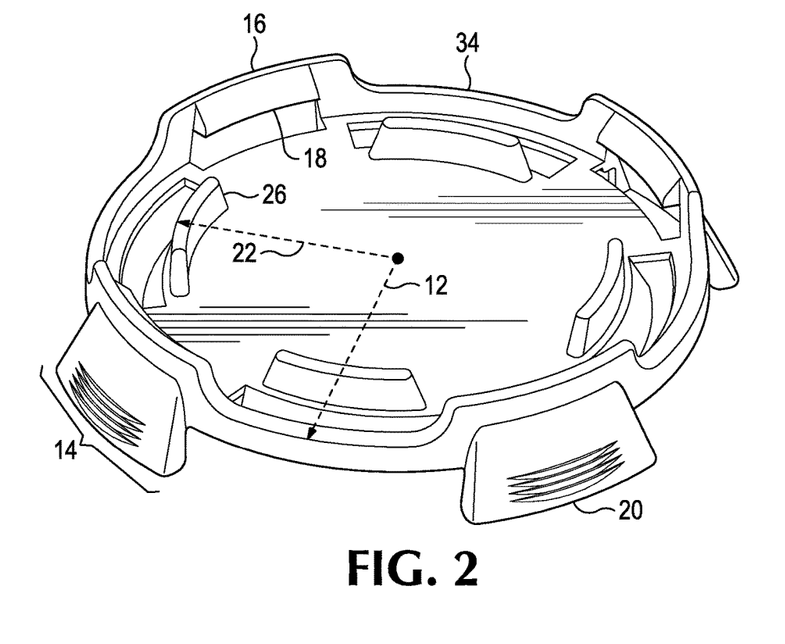
FIG. 2 illustrates a bottom perspective of the stacking clip of FIG. 1.

Turning to the figures, FIGS. 1 and 2 depict a stacking clip configured to attach to the top side of a first beverage can and to the bottom side of a second beverage can. In one example, the stacking clip 10 comprises a plastic clip body 11 having a top side (facing upward in FIG. 1) that is configured to attach to a bottom of a first beverage can and a bottom side (facing upward in FIG. 2) configured to attach to a top of a second beverage can, as discussed below.

Figure 4:
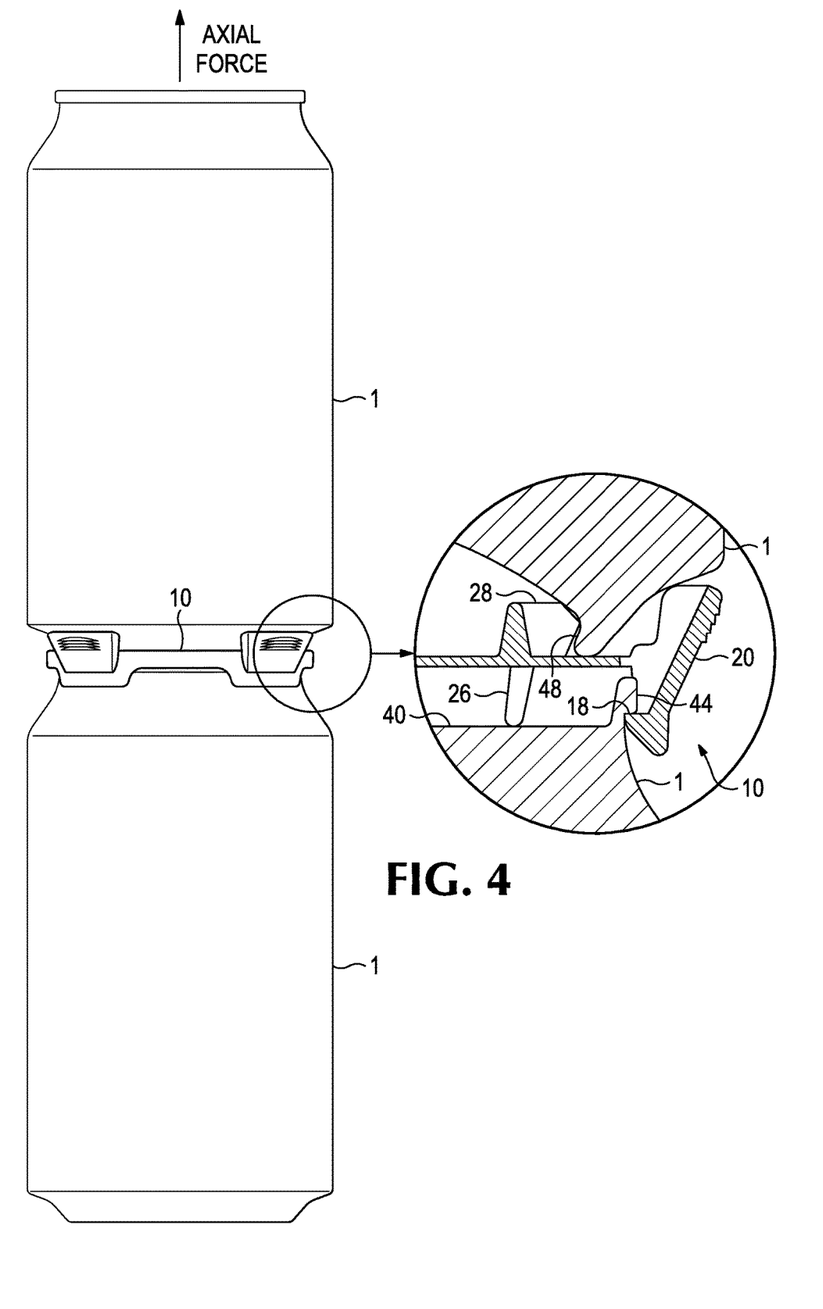
FIG. 4 is a side view illustrating two beverage cans stacked with the stacking clip of FIG. 1.

Four outer securing structures 14 radially offset from each other may be formed on the clip body 11 around a substantially circular outer perimeter formed by a radius 12, each of the outer securing structures 14 including an outer tab 16, a ledge 18 and a wing 20 where the structures 14 may be joined by an outer ring structure 34. Typically the radial offset between the outer securing structures 14 is equal, and four securing structures are provided; however in alternative embodiments, the radial offset may be unequal and/or a different number, such as three, securing structures 14 may be provided. The outer tabs may be formed extending downwardly from the bottom of the clip body 11, each with a ledge affixed at the bottom end that extends inward toward a central region 32 of the clip body 11, the central region 32 also being referred to as a cover. Each wing 20 may be formed extending upward from an outer tab 16 away from the top side of the clip body 11 and may be formed with gripping texture on the outside surface for reasons including providing purchase for the digit 50 of a user 52, as shown in FIG. 4, and providing a visual and tactile hint or cue as to how to operate the stacking clip. The outer ring structure 34 that joins the outer securing structures 14 follows the circumference of the outer perimeter providing structural support.

Additionally, four inner securing structures 24 radially offset from each other may be formed on the clip body around a substantially circular intermediate perimeter formed by radius 22, each including a support tab 26, a clipping protrusion 28 and a cavity 30 where the structures may be affixed to a reinforcing circular rib 36. It will be appreciated that while four inner securing structures are shown with equal radial offset, in other embodiments a different number of inner securing structures 24 may be provided to match a different number of outer securing structures 14 and/or the radial offset of the inner securing structures 24 may be unequal. The support tabs 26 may be formed extending downwardly from the clip body 10. The clipping protrusions 28 may be formed extending upwardly from the clip body, forming one wall of the cavity 30 while the reinforcing circular rib 36, formed extending upwardly from the clip body 10 around the circumference of the intermediate perimeter, forms another.

Figure 3:
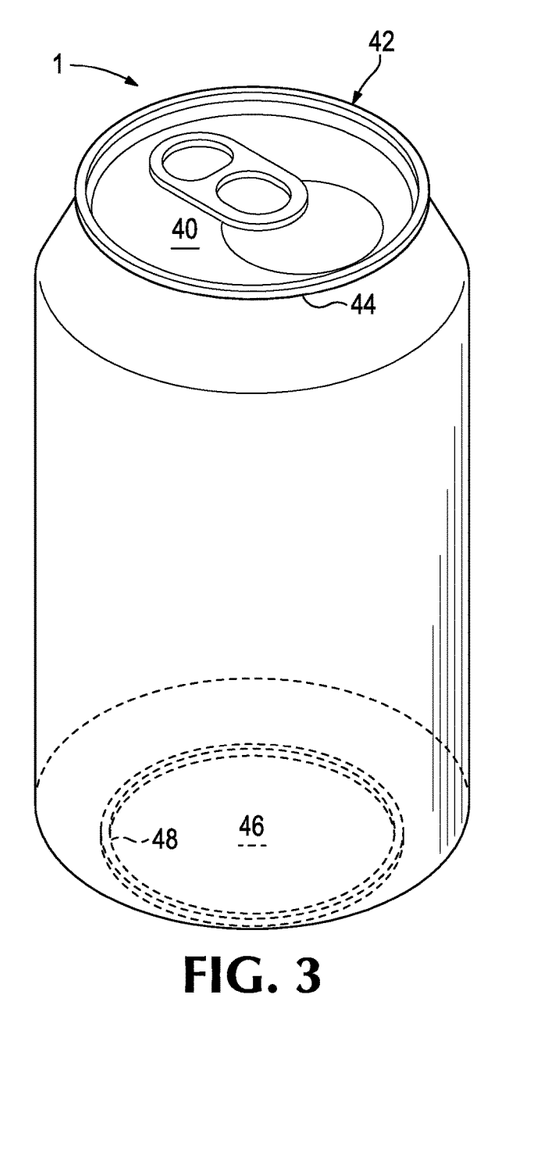
FIG. 3 is a side view of a beverage can, and illustrates the structures on a beverage can to which an embodiment of the present invention may clip.

An example of a beverage can 1 that the stacking clip 10 is configured to attach to is shown in FIG. 3. Beverage can 1 typically includes, at the top side of the can, a top horizontal surface 40 surrounded by a circular rim 42 extending upward from the top of the can 1, with an outer lip 44 bulging outwardly from the top of the circular rim. The beverage can 1 also typically includes, at the bottom side of the can 1, a concavity 46 bulging upwardly into the body of the can 1, where an undercut region 48 is formed around the interior of the perimeter of the concavity.

An example of two beverage cans 1 successfully stacked using the stacking clip is shown in FIG. 4. In a preferred assembly process, the stacking clip 10 is first installed on the lower beverage can, and then the upper beverage can is installed on a top side of the stacking clip 10. To disassemble the beverage cans, preferably the upper beverage can is grasped and a rotational moment applied, to thereby release or "break" the upper beverage can from the grip of the stacking clip 10, while the staking clip remains affixed to the lower beverage can. The user then removes the stacking clip 10 from the lower beverage can, to ready the can for opening.

Features of the stacking clip 10 that enable it to releasably grasp the upper and lower beverage cans will now be explained. The stacking clip 10 attaches to the top side of the lower beverage can when ledge 18 from an outer securing structure 14 releasably grips the outer lip 44 of the can. The distal end of the support tab 26 contacts the top horizontal surface 40 of the can to provide, at least, weight distribution and subjacent support for the clipping protrusion 28. To couple the upper beverage can, the stacking clip 10 attaches to the bottom side of the upper beverage can when clipping protrusions 28 of each inner securing structure 24 contact the undercut region 48 of the lower can, while corresponding support tabs 26 are in contact with top horizontal surface 40 of the lower can. The support tabs 26 supply subjacent support to each of the clipping protrusions 28, ensuring that the clipping protrusions 28 stand proud and upright sufficiently to be wedged into the undercut region 48. Without the contact between the horizontal surface 40 and support tabs 26, natural flexibility in the plastic of the clip body 11 can cause the clipping protrusions 28 to bend downward and fail to engage the undercut region 48, resulting in a failure to secure the upper can to the stacking clip 10.

During the process of coupling the upper beverage can to the stacking clip, wings 20, which are slanted inward toward the central region, contact an inwardly sloping surface around the bottom of the upper can. As the wings 20 contact the bottom of the upper can, they serve to center the upper can on the stacking clip 10. This has the effect of aligning the undercut region 48 with clipping protrusions 28, so that it is easier to wedge the clipping protrusions 28 into the undercut region 48 and secure the upper can to the clip 10.

Figure 4A:
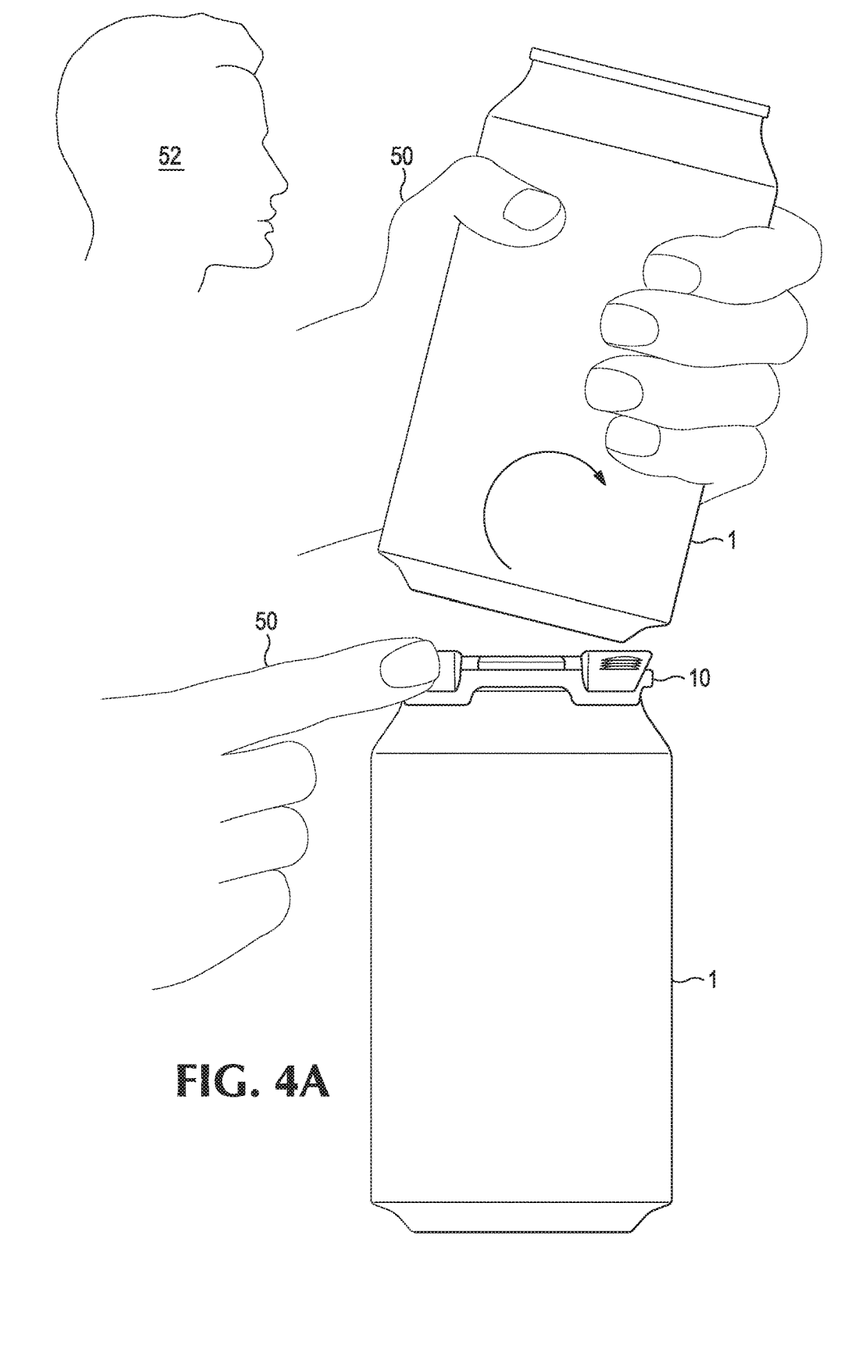
FIG. 4A is a side view illustrating the two beverage cans of FIG. 4, in a released configuration.

As shown in FIG. 4A, to decouple the cans 1 a user may grasp the lower and upper cans in each hand, and apply a relative rotational force (moment), as shown, to release or "break" the bond between the upper beverage can and the stacking clip, causing the clipping protrusions 28 to disengage from the undercut region 48. The stacking clip is design so that the force required to release the upper beverage can from the stacking clip via such a rotational moment is less than an axial force AF (see FIG. 4) applied in a tensile manner along the elongate axis of the can. This increases the ability of the stackable clip to secure the upper and lower beverage cans when lifted directly from above, for example, by a multipack handle 100 as shown in FIG. 12, while still enabling separation of the cans with a reasonable amount of force.

Continuing with FIG. 4A, to detach the lower beverage can from the clip 10, wings 20 from the outer securing structure 14 may be flexed inward under the influence of a digit 50 of a hand of a user 52 to bias the ledge outward away from the central region of the clip body. In other words, a user may squeeze the clip 10 to release the lower beverage can. As an additional feature, if a user squeezes the wings 20 when the upper can and lower can are simultaneously attached to the stacking clip 10, the wings 20 cannot be biased inwardly sufficiently to cause release of the lower beverage can. This is due to the fact that wings 20 are positioned close to the base of the upper beverage can and if flexed will contact the base of the upper beverage can to inhibit the release of the lower beverage can. This is advantageous during shipping and transport of the cans 1, for example, as it prevents unwanted disengagement of the cans 1.

Figure 12:
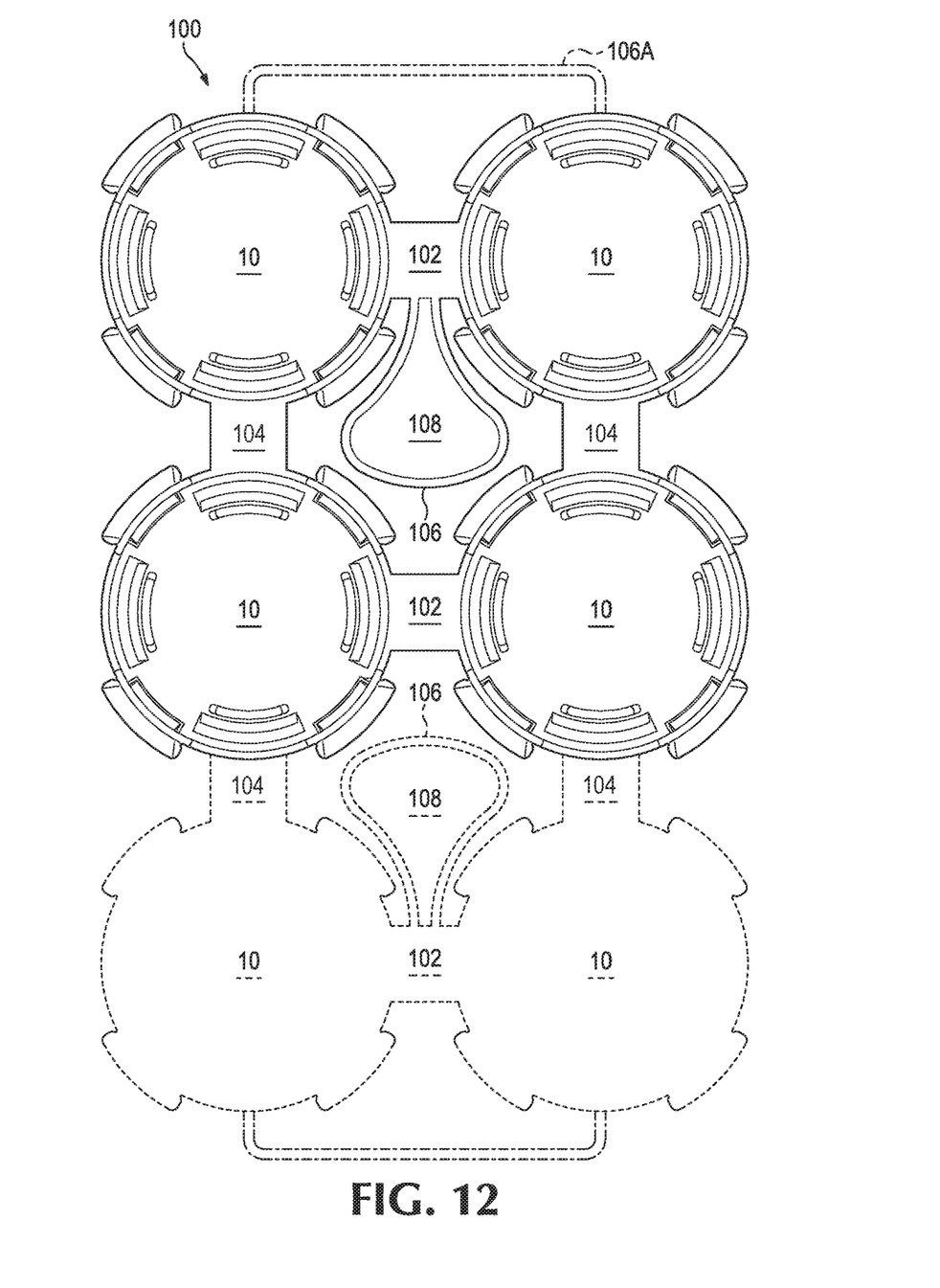
FIG. 12 is schematic view showing a second embodiment in which multiple stacking clips of FIG. 1 have been combined to form a multi-pack container holder, with graspable loops.

In one example use scenario, two six packs may be stacked on each other with stacking clips joining each vertically adjacent pair of cans and a multi-pack handle 100 as shown in FIG. 12 secures the top sides of the top six cans together. This effectively creates a 12 pack that is twice as tall as a six pack. Additional multi-pack handles 100 of stacking clips may be used to stack 3 or even 4 six packs together. Of course, 12 packs, singles, or multi-packs of other capacities may be stacked as desired as well using stacking clips 10 in 12 pack, single, or other configurations as desired. Use of the stacking clips 10 in this manner gives additional flexibility to the retailer. Additionally, the securely stacked beverage cans may aid in organizing a refrigerator by filling space on tall shelves or in the door that would otherwise be wasted. Furthermore, the ability to carry two beverage cans safely in one hand would provide a social benefit, such as a consumer carrying cans of beer to their seat at a baseball game, to be shared with a friend.

Figure 5:
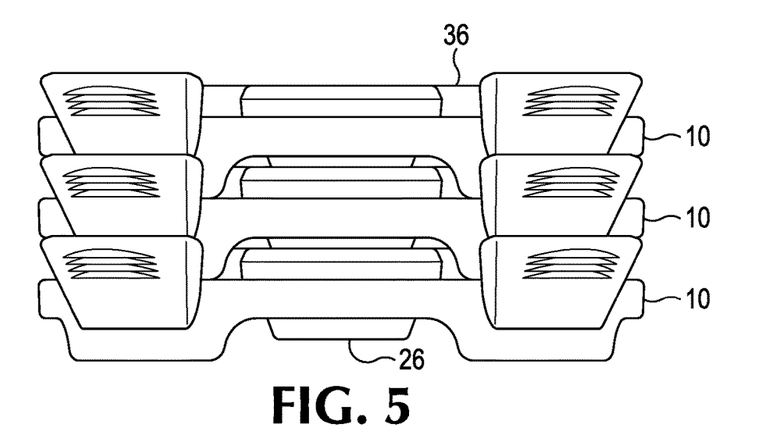
FIG. 5 is a side view illustrating multiple stacking clips of FIG. 1 stacked together.
Figure 6:
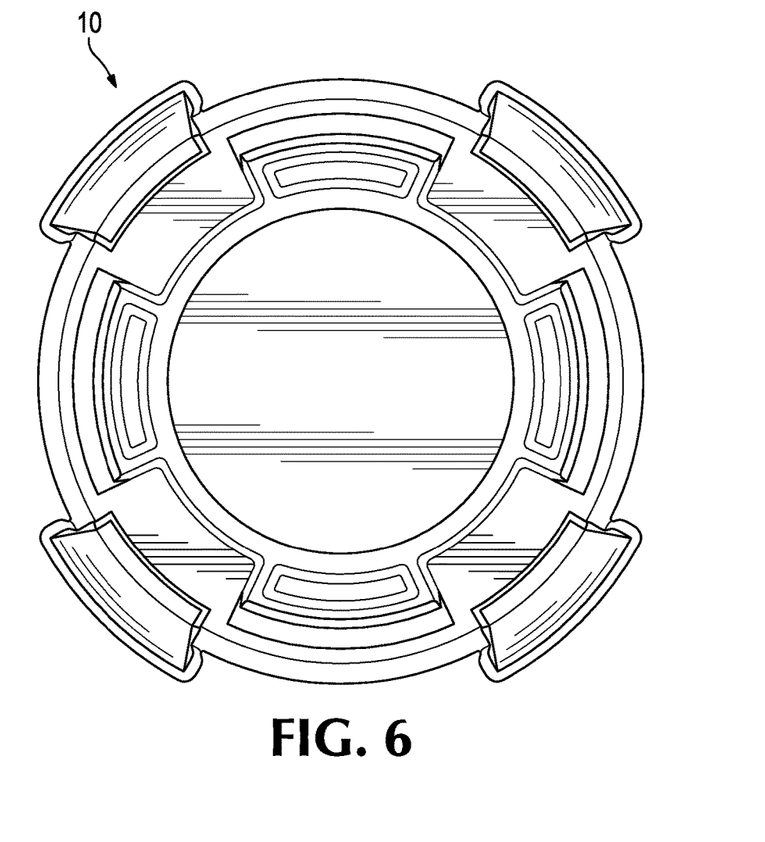
FIG. 6 is a top view of the stacking clip of FIG. 1.
Figure 7:
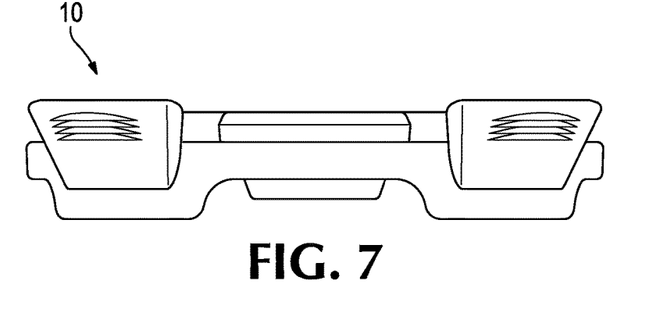
FIG. 7 is a front side view of the stacking clip of FIG. 1.
Figure 8:
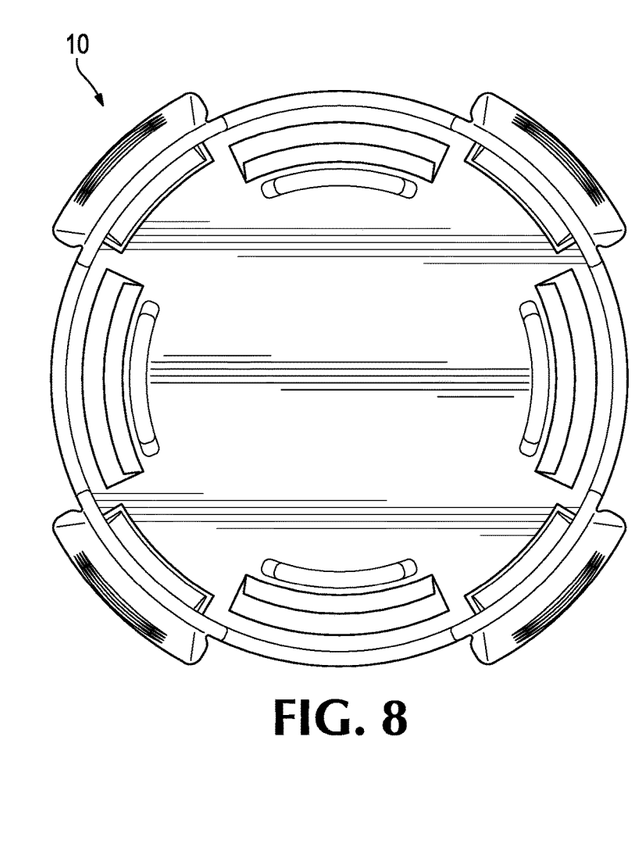
FIG. 8 is a bottom view of the stacking clip of FIG. 1.
Figure 9:
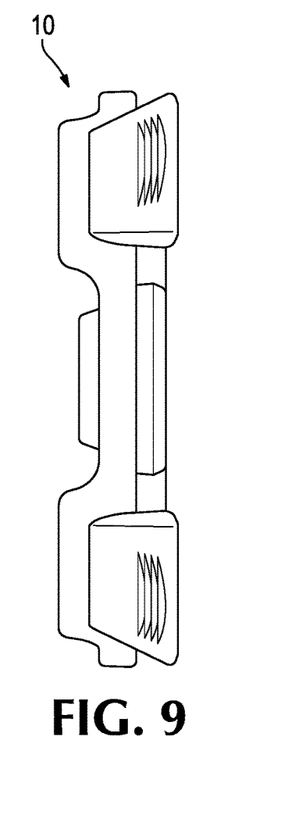
FIG. 9 is a left side view of the stacking clip of FIG. 1.
Figure 10:
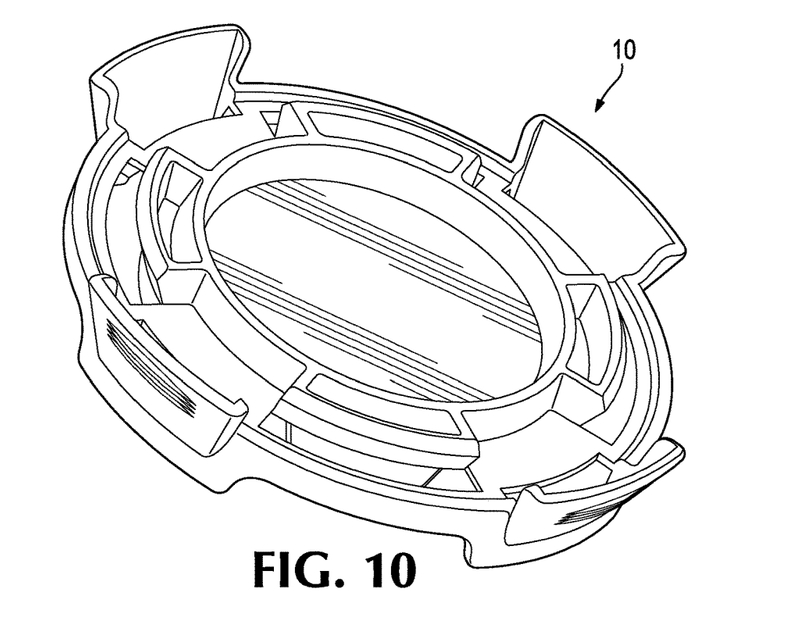
FIG. 10 is a top perspective view from a different angle than FIG. 1.
Figure 11:
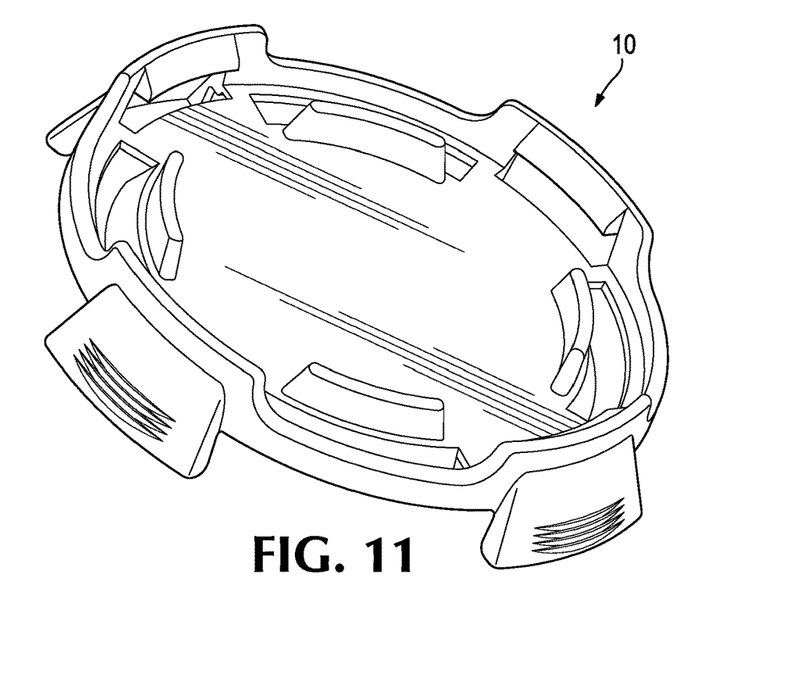
FIG. 11 is a bottom perspective view from a different angle than FIG. 1.

FIG. 5 depicts stacking the stacking clips 10 on top of each other, typically done when stacking clips are being stored or transported by themselves. The clip bodies 10 of the stacking clips may be aligned such that the support tabs 26 of one stacking clip fit shallowly inside the cavities 30 of a second, while the support tabs of the second stacking clip fit inside the cavities of a third, and so forth. This arrangement minimizes movement and provides load bearing to prevent the clipping structures from deforming. It also minimizes transportation costs by enabling highly dense packing of the clips.

FIGS. 6-11 further illustrate the stackable clip from a number of different angles.

It should be understood that while the present description shows four outer securing structures and four inner securing structures, other numbers are also possible to provide secure attachment to beverage cans. As discussed above, while the four outer securing structures and four inner securing structures are shown at equal radial spacing from each other, it will be appreciated that different spacing may be utilized.

FIG. 12 illustrates a second embodiment in which multiple stacking clips 10 have been combined to form a multi-pack container holder 100. Multi-pack container holder 100 includes four stacking clips 10 in the embodiment illustrated in solid lines, and six stacking clips 10 in the embodiment illustrated in dashed lines, although it will be appreciated that multi-pack container holder 100 may alternatively be provided with two, three, eight or other number of multiple stacking clips 10. The stacking clips 10 are illustrated schematically for ease of illustration as circles in FIG. 12; however, it will be appreciated that they are typically configured with all of the structures illustrated in the first embodiment, shown above in FIG. 1 et seq. Multi-pack container holder 100 includes first bridging portions 102 extending horizontally in FIG. 12 and second bridging portions 104 extending vertically in FIG. 12. These bridging portions are formed integrally with the stacking clips 10 and serve to integrate them into a combined holder. One or a pair of graspable loops 106 are also provided for a user to insert a finger and thumb and carry the multi-pack container holder and six associated beverage containers. The graspable loops are illustrated as coupled to respective first bridging portions 102 and formed within a void 108 in a central region surrounded by four stacking clips 10, two first bridging portions 102, and two second bridging portions 104 of the multi-pack container holder 100. It will be appreciated that the graspable loops 106 typically are configured to flex upward, out of the page in FIG. 12, under the weight of the beverage containers when lifted. Two opposed graspable loops 106 are typically provided on the six-pack embodiment illustrated in dashed lines, and a single graspable loop 106 is typically provide on the four-pack embodiment illustrated in solid lines. Further, each graspable loop 106 is illustrated as being formed within an internal void 108 in the multi-pack container holder 100; however, in other embodiments graspable loops 106A may be formed extending from a front, rear, right and/or left side of the multi-pack container holder 100 (i.e., the top, bottom right or left sides of the container holder as viewed in FIG. 12), as shown in dot-dashed lines. Finally, while the graspable loops are described as loops, it will be appreciated that they may include corners, and be partially rectangular in shape, as illustrated at 106A.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. For example, although the figures are drawn to scale, numerous variations may be made in the size and shape of the components illustrated.

The invention claimed is:

1. A container system, comprising:
   an upper container; and
   a clip body with a top side attached to a bottom of the upper container and a bottom side configured to attach to a top of a lower container, the clip body including:
   a plurality of outer securing structures formed around a substantially circular outer perimeter of the clip body, each outer securing structure including an outer tab, a ledge formed at a bottom end of the outer tab and extending inward toward a central region of the clip body, and a wing extending upward from the outer tab and outward away from the central region of the clip body in a radial direction, wherein
   each wing is positioned proximate a base of the upper container and configured to contact an inwardly sloping surface around the bottom of the upper container during a coupling operation of the upper container to the clip body;
   each ledge grips an outer lip of a circular rim formed on the top side of the lower container, to thereby collectively releasably grip the lower container; and
   the wing is formed on the outer tab opposite a corresponding ledge in an axial direction and is configured to flex when an inward force is applied by a digit of a user to thereby bias the corresponding ledge away from the central region of the clip body and release the lower container.

2. The container system of claim 1, where the clip body is made of plastic.

3. The container system of claim 1, wherein the plurality of outer securing structures includes four outer securing structures.

4. The container system of claim 1, wherein the plurality of outer securing structures are spaced around the outer perimeter.

5. The container system of claim 4, wherein the plurality of outer securing structures are spaced evenly around the outer perimeter.

6. The container system of claim 1, wherein the wing is configured to rest in a spaced apart orientation from the bottom side of the upper container when the upper container is gripped, so that the wing is prevented from being flexed inwardly sufficiently to release the ledge from the lip of the rim of the lower container when the upper container is secured in the clip body.

7. The container system of claim 1, further comprising:
   an outer ring structure formed along the outer perimeter joining the outer securing structures together.

8. The container system of claim 1, further comprising a plurality of inner securing structures formed around a substantially circular intermediate perimeter of the clip body, each inner securing structure including a support tab, a clipping protrusion, and a cavity where the inner securing structures may be affixed to a reinforcing circular rib.

9. The container system of claim 8, wherein the central region is filled by a solid cover formed within the intermediate perimeter.

10. The container system of claim 8, further comprising:
    the reinforcing circular rib on the top side of the clip body around the intermediate perimeter.

11. The container system of claim 10, wherein the circular rib extends upwardly from the clip body.

* * * * *